United States Patent
Armstrong et al.

(10) Patent No.: US 11,016,647 B2
(45) Date of Patent: May 25, 2021

(54) WEB-BASED CLIENT-SERVER GEOMETRIC DESIGN METHODS

(71) Applicant: CADONIX LTD, Long Crendon (GB)

(72) Inventors: Andrew James Armstrong, Long Crendon (GB); Fergus Cosmo Robert Kendall, Long Crendon (GB)

(73) Assignee: CADONIX LTD

( * ) Notice: Subject to any disclaimer, the term of this patent is extended or adjusted under 35 U.S.C. 154(b) by 196 days.

(21) Appl. No.: 15/508,798

(22) PCT Filed: Sep. 26, 2014

(86) PCT No.: PCT/GB2014/052923
§ 371 (c)(1),
(2) Date: Mar. 3, 2017

(87) PCT Pub. No.: WO2016/034833
PCT Pub. Date: Mar. 10, 2016

(65) Prior Publication Data
US 2017/0235474 A1    Aug. 17, 2017

(30) Foreign Application Priority Data
Sep. 4, 2014   (GB) ..................... 1415685

(51) Int. Cl.
*G06F 3/048*  (2013.01)
*G06F 3/0484*  (2013.01)
(Continued)

(52) U.S. Cl.
CPC ...... *G06F 3/04847* (2013.01); *G06F 16/2379* (2019.01); *G06F 30/00* (2020.01); *G06F 2111/02* (2020.01)

(58) Field of Classification Search
None
See application file for complete search history.

(56) References Cited

U.S. PATENT DOCUMENTS 7,149,959 B1 * 12/2006 Jones ..................... G06Q 10/06
715/234
7,353,252 B1 * 4/2008 Yang ..................... G06Q 10/10
709/204

(Continued)

FOREIGN PATENT DOCUMENTS

WO         01/55831  A1      8/2001

OTHER PUBLICATIONS

International Search Report, Application No. PCT/GB2014/052923, dated Apr. 23, 2015, 3 pages.

*Primary Examiner* — Hua Lu
(74) *Attorney, Agent, or Firm* — Ware, Fressola, Maguire & Barber LLP

(57) ABSTRACT

A method comprises: sending, to a client, data specifying a plurality of commands for use in producing a design; receiving, from the client, one of the plurality of commands, wherein the received command is for creating or modifying a new or existing element of the design, respectively; updating a data structure associated with the design in accordance with the command, wherein the update comprises adding or modifying data associated with the new or existing element, respectively; and sending, to the client, data for enabling the new or modified element to be represented via a user interface.

24 Claims, 12 Drawing Sheets

(51) Int. Cl.
  *G06F 16/23*   (2019.01)
  *G06F 30/00*   (2020.01)
  *G06F 111/02*  (2020.01)

(56) References Cited

U.S. PATENT DOCUMENTS

| | | | | |
|---|---|---|---|---|
| 9,019,266 | B2* | 4/2015 | Hoguet | G06T 19/00 |
| | | | | 345/419 |
| 10,303,809 | B2* | 5/2019 | Banta | G06F 30/17 |
| 2002/0049786 | A1* | 4/2002 | Bibliowicz | G06Q 10/10 |
| | | | | 715/211 |
| 2004/0019402 | A1* | 1/2004 | Bourne | G05B 19/4069 |
| | | | | 700/165 |
| 2004/0046776 | A1* | 3/2004 | Phillips | G06F 9/451 |
| | | | | 715/700 |
| 2004/0225968 | A1* | 11/2004 | Look | G06Q 10/10 |
| | | | | 715/778 |
| 2006/0176295 | A1* | 8/2006 | Toho | G06T 19/00 |
| | | | | 345/419 |
| 2006/0284867 | A1* | 12/2006 | Ishikawa | G06F 30/00 |
| | | | | 345/419 |
| 2008/0165189 | A1* | 7/2008 | Nakayama | G06T 13/20 |
| | | | | 345/420 |
| 2008/0189083 | A1* | 8/2008 | Schell | G06F 30/17 |
| | | | | 703/1 |
| 2009/0100368 | A1* | 4/2009 | Look | G06Q 10/10 |
| | | | | 715/775 |
| 2009/0254874 | A1* | 10/2009 | Bose | G06F 30/39 |
| | | | | 716/113 |
| 2010/0042376 | A1* | 2/2010 | Weatherhead | G06F 8/34 |
| | | | | 703/1 |
| 2010/0114355 | A1* | 5/2010 | Harashima | G06Q 50/04 |
| | | | | 700/107 |
| 2010/0321478 | A1* | 12/2010 | Sliwa | G09G 3/34 |
| | | | | 348/51 |
| 2012/0086719 | A1* | 4/2012 | Brown | G06T 17/30 |
| | | | | 345/582 |
| 2013/0013264 | A1* | 1/2013 | Narayan | G06T 17/05 |
| | | | | 703/1 |
| 2013/0151551 | A1* | 6/2013 | Chow | G06F 16/3331 |
| | | | | 707/769 |
| 2013/0159833 | A1* | 6/2013 | Look | G06F 3/04812 |
| | | | | 715/230 |
| 2016/0048293 | A1* | 2/2016 | Chen | G06F 3/04842 |
| | | | | 715/851 |
| 2017/0148227 | A1* | 5/2017 | Alsaffar | G06T 11/60 |

* cited by examiner

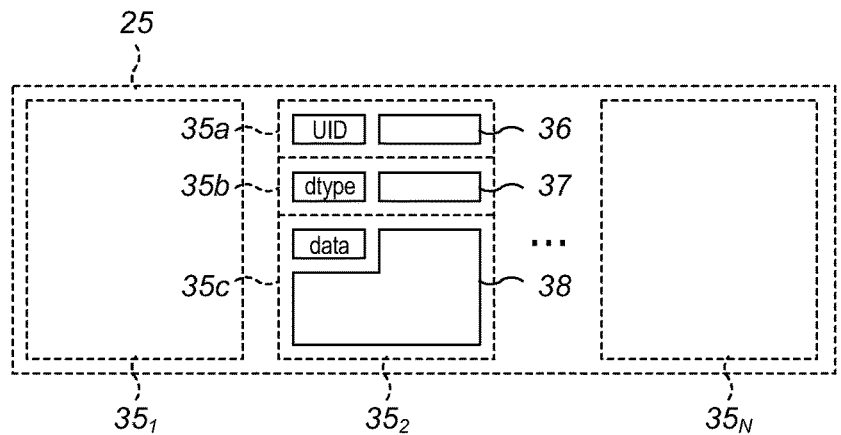
FIG. 8
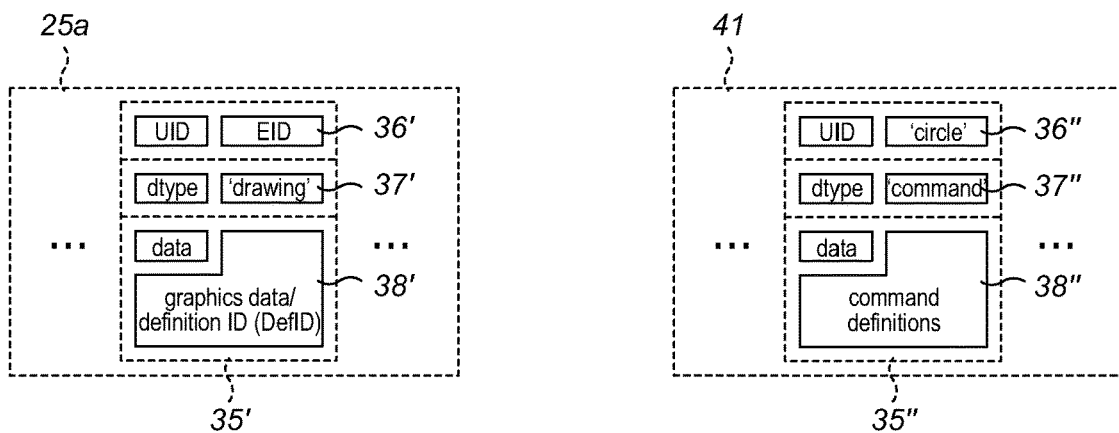
FIG. 9A
FIG. 9B
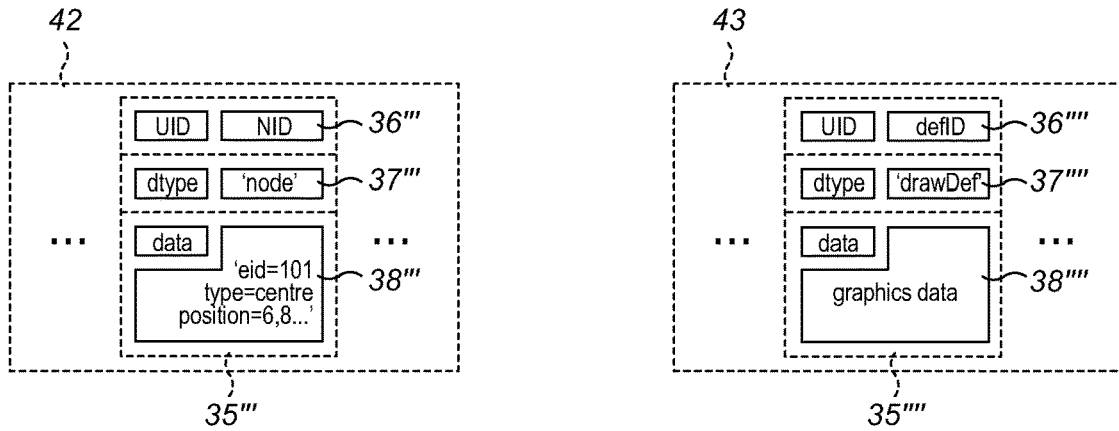
FIG. 9C
FIG. 9D

WEB-BASED CLIENT-SERVER GEOMETRIC DESIGN METHODS

FIELD

The present invention relates, amongst other things, to methods for producing designs.

BACKGROUND

Computer-aided design systems to assist in the creation, modification, analysis, or optimization of designs are known. For example, EP 1 302 904 B1 describes a computer-implemented method of modeling a three-dimensional object.

SUMMARY

According to a first aspect of the present invention, there is provided a method comprising:
sending, to a client, data specifying a plurality of commands for use in producing a design;
receiving, from the client, one of the plurality of commands, wherein the received command is for creating or modifying a new or existing element of the design, respectively;
updating a data structure associated with the design in accordance with the command, wherein the updating comprises adding or modifying data associated with the new or existing element, respectively; and
sending, to the client, data for enabling the new or modified element to be represented via a user interface.

The method may comprise sending the data specifying the plurality of commands in response to a request from the client.

The method may comprise selecting the plurality of commands in dependence upon a type of the design.

The data specifying the plurality of commands may specify, for each command, any parameters associated with the command.

The method may comprise sending, in response to a request from the client, data for enabling one or more elements of the design to be represented via the user interface.

The method may comprise sending data for enabling one or more nodes to be represented via the user interface, wherein each of the one or more nodes is for enabling a user to modify one of the elements of the design.

The data for enabling an element or node to be represented via the user interface may specify an identifier of the element or node, respectively.

The data for enabling an element to be represented via the user interface may comprise raster or vector graphics data; and the method may comprise rendering the raster or vector graphics data, wherein the rendering comprises using data associated with the element obtained from the data structure.

The method may comprises sending, to the client, raster or vector graphics data; and the data for enabling an element or node to be represented via the user interface may comprise an identifier of the raster or vector graphics data.

The method may comprise creating an identifier of the new element and/or of any nodes associated with the new element.

The data structure may comprise data specifying, for each of one or more elements of the design, one or more nodes associated with the element. The data structure may comprise data specifying one or more attributes of each element and one or more attributes of each node. An attribute of an element may correspond to a type of the element, and an attribute of a node may correspond to a location of the node. The received command may specify a modification of at least one attribute of the existing element and/or of at least one node associated therewith, and updating the data structure may comprise modifying the data specifying the at least one attribute.

The method may comprise: receiving, from the client, data specifying an uncompleted command for creating or modifying the new or existing element; and sending, to the client, data for enabling a preview of the command to be provided via the user interface.

The received command may be a command to copy or cut an element, and the method may comprise storing data associated with the element obtained from the data structure. The received command may be a command to paste an element; and the method may comprise adding, to the data structure, previously stored data associated with the element.

The method may comprise sending, to the client, a command for causing the client to perform an action.

The method may comprise, in response to a request from the client: producing a document comprising one or more elements of the design, wherein the document is for printing by the client; and providing the document to the client.

The method may comprise, in response to a request from the client: simulating one or more aspects of the design, and providing results of the simulation to the client.

The sent and received data may comprise data with an attribute-value pair data structure. The sent and received data may comprise a data type identifier.

The design may correspond to a drawing.

According to a second aspect of the present invention, there is provided a method comprising:
receiving, from a server, data specifying a plurality of commands for use in producing a design;
providing a user interface in accordance with the received data;
receiving, via the user interface, one or more inputs corresponding to one of the plurality of commands, wherein the command is for creating or modifying a new or existing element of the design, respectively;
sending the command to the server;
receiving, from the server, data for enabling a representation of the new or modified element to be represented via the user interface; and
providing, via the user interface, a representation of the new or modified element.

The method may comprise, in response to a user input, requesting the data specifying the plurality of commands from the server.

The data specifying the plurality of commands may specify, for each command, any parameters associated with the command; and the user interface may be configured to obtain values for each of the parameters associated with the command before sending the command.

The method may comprise: receiving, from the server, data for enabling one or more elements of the design to be represented via the user interface; and providing, via the user interface, a representation of the one or more elements of the design.

The method may comprise receiving data for enabling one or more nodes to be represented via the user interface, wherein each of the one or more nodes is for enabling a user to modify one of the elements of the design; the method may comprise providing, via the user interface, a representation of the one or more nodes; and the one or more inputs may comprise at least one input in relation to one of the one or more nodes.

The data for enabling an element or node to be represented via the user interface may specify an identifier of the element or node, respectively; the one or more inputs may comprise at least one input in relation to the existing element and/or at least one node associated therewith; and the command may specify the identifier of the existing element and/or the at least one node associated therewith.

The command may specify a modification of at least one attribute of the existing element and/or of at least one node associated therewith. An attribute of an element may corresponds to a type of the element, and/or an attribute of a node may correspond to a location of the node.

The data for enabling an element or node to be represented via the user interface may comprise raster or vector graphics data; and providing the representation of the element or node, respectively, may comprise displaying the raster or vector graphics data.

The method may comprises receiving, from the server, raster or vector graphics data; the data for enabling an element or node to be represented via the user interface may comprise an identifier of the raster or vector graphics data; and providing the representation of the element or node, respectively, may comprise displaying the raster or vector graphics data.

The method may comprise: receiving, via the user interface, one or more inputs corresponding to an uncompleted command for creating or modifying the new or existing element, respectively; and providing, via the user interface, a preview of the command.

The method may comprise, in response to a command from server, performing an action.

The sent and received data may comprise data with an attribute-value pair data structure. The sent and received data may comprise a data type identifier.

Thus, a design can be produced using a client in communication with a server in a way which is effective and which minimises demands on the client.

According to a third aspect of the present invention, there is provided computer program code comprising instructions for performing a method according to the first or second aspect of the present invention.

There may be a computer-readable medium storing the computer program code.

According to a fourth aspect of the present invention, there is provided apparatus configured to perform a method according to the first or second aspect of the present invention.

The user interface may be provided by a web browser.

The apparatus may comprise at least one processor and at least one memory including computer program code, the at least one memory and the computer program code configured to, with the at least one processor, cause the apparatus to perform the method.

There may be provided a system comprising: at least one server comprising apparatus configured to perform a method according to the first aspect of the present invention; and a plurality of clients configured to communicate with the at least one server, each client comprising apparatus configured to perform a method according to the second aspect of the present invention.

Further advantages are described below.

BRIEF DESCRIPTION OF THE DRAWINGS

Certain embodiments of the present invention will now be described, by way of example only, with reference to the drawings in which:

FIG. 8 illustrates a structure of the data of FIG. 5;
FIG. 9A illustrates ('drawing') data which may be part of the data of FIG. 5;
FIG. 9B illustrates ('command definition') data which is part of the data of FIG. 5;
FIG. 9C illustrates ('node') data which may be part of the data of FIG. 5;
FIG. 9D illustrates ('drawing definition') data which may be part of the data of FIG. 5.

DETAILED DESCRIPTION OF THE CERTAIN EMBODIMENTS

Figure 1:
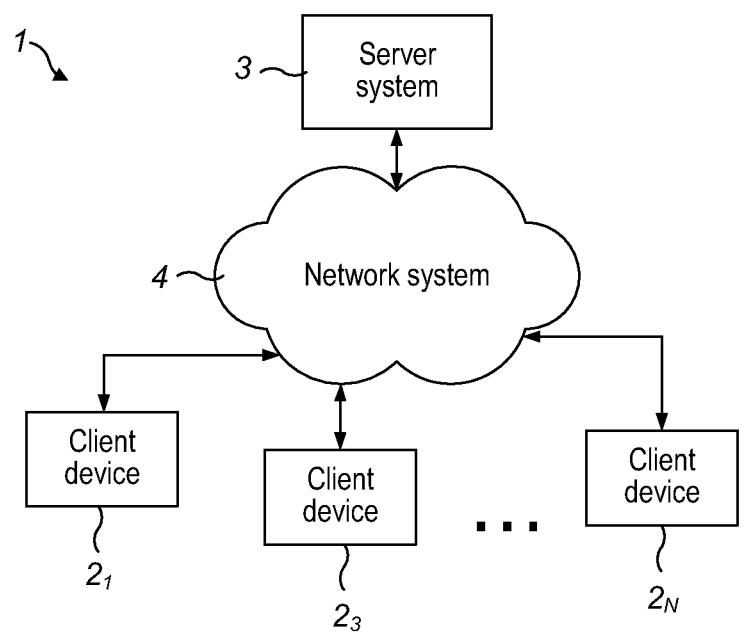
FIG. 1 illustrates a system.

Referring to FIG. 1, a system 1 will now be described. The system 1 includes several devices $2_1 \ldots 2_N$ (hereinafter referred to as clients) connectable to a central device 3 (hereinafter referred to as a server) via a network system 4. As will be explained in more detail below, each client 2 can communicate with the server 3 via the network system 4. The client 2 together with the server 3 can enable a user of the client 2 (hereinafter referred to as the user) to produce, and/or take other actions in relation to, a design. The design may be, for example, a design of a vehicle electrical system or wiring harness.

Figure 2:
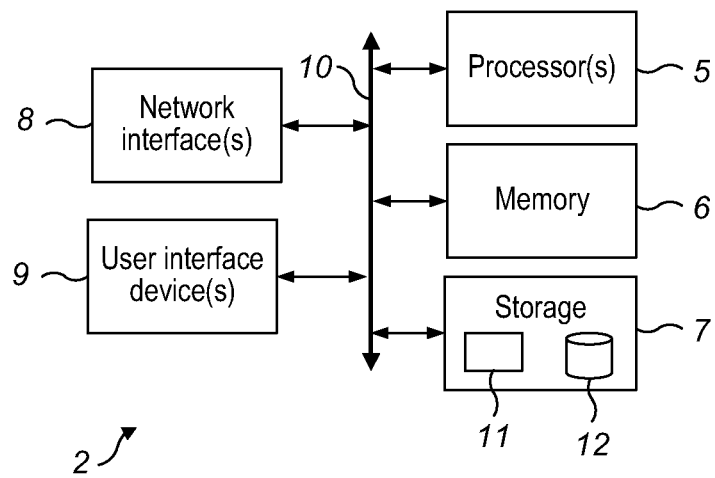
FIG. 2 illustrates a client of the system of FIG. 1.

Referring to FIG. 2, a client 2 will now be described in more detail. The client 2 includes, amongst other things, one or more processors 5, memory 6, storage 7, one or more network interfaces 8 and one or more user interface devices 9. The processors 5 communicate with other elements 6, 7, 8, 9 of the client 2 via one or more buses 10, either directly or via one or more interfaces (not shown). The memory 6 includes volatile memory (e.g. dynamic random-access memory). Amongst other things, the memory 6 is used by the processors 5 for temporary data storage, for example when controlling operation of another element of the client 2 or when moving data between elements of the client 2. The storage 7 includes non-volatile (non-transitory) memory (e.g. read-only memory, flash memory) and/or storage (e.g. magnetic storage). The storage 7 stores computer-readable instructions 11. The computer-readable instructions 11 include system software and application software. The application software preferably includes a web browser software application (hereinafter referred to as a web browser). The storage 7 also stores data 12 for use by the client 2 including, amongst other things, data received from the server 3. The network interfaces 8 are configured to communicate with one or more types of network, for example an Ethernet network, a wireless local area network and/or a cellular data network. The user interface devices 9 preferably include a display and may include other output devices such as loudspeakers. The user interface devices 9 preferably include a keyboard, pointing device (e.g. mouse) and/or touchscreen and may include other input device such as microphones, sensors, etc. Hence the client 2 is able to provide user interfaces for the user.

Figure 3:
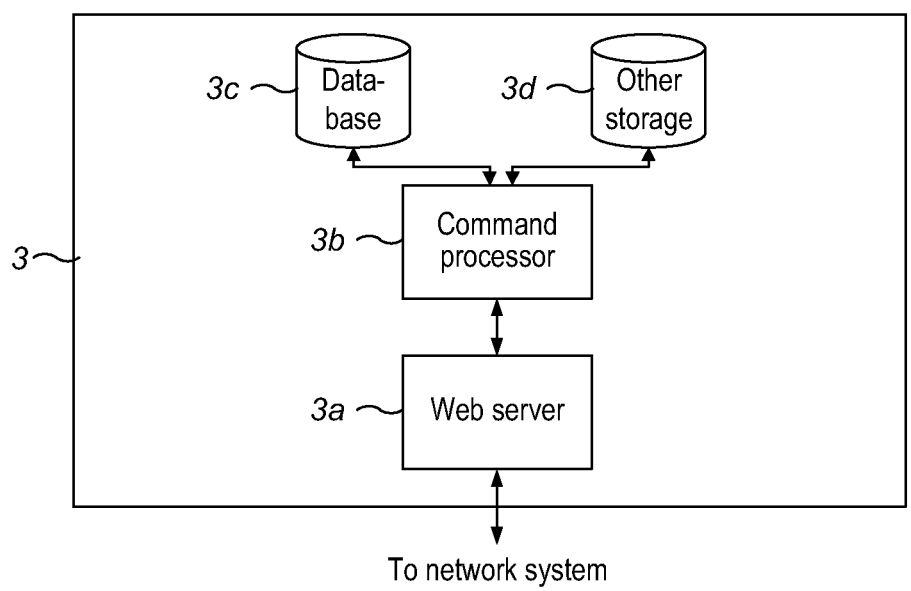
FIG. 3 illustrates a server of the system of FIG. 1.

Referring to FIG. 3, the server 3 will now be described in more detail. The server 3 may correspond to a cloud computing system, a computer cluster or a single computer (e.g. as described above in relation to the client 2). The server 3 includes several software and/or hardware modules, including a web server 3a, a command processor 3b, a database 3c (hereinafter referred to as the design database 3c) and further storage 3d. The web server 3a is configured to handle communications with the clients $2_1 \ldots 2_N$. The command processor 3b is configured to handle other operations performed by the server 3. The design database 3c will be described below. The further storage 3d is configured to store other data for use by the server 3 including, for example, software libraries and assets such as image data.

Referring again to FIG. 1, the network system 4 preferably includes a plurality of interconnected networks including one or more local area networks (e.g. Ethernet networks, Wi-Fi networks), one or more mobile/cellular data networks (e.g. 2nd, 3rd and/or 4th generation networks) and the Internet. Each of the clients $2_1 \ldots 2_N$ is connectable to the server 3 by a respective set of the networks in the network system 4. Hence, each of the clients $2_1 \ldots 2_N$ is able to send data to the server 3 and vice versa.

Figure 4:
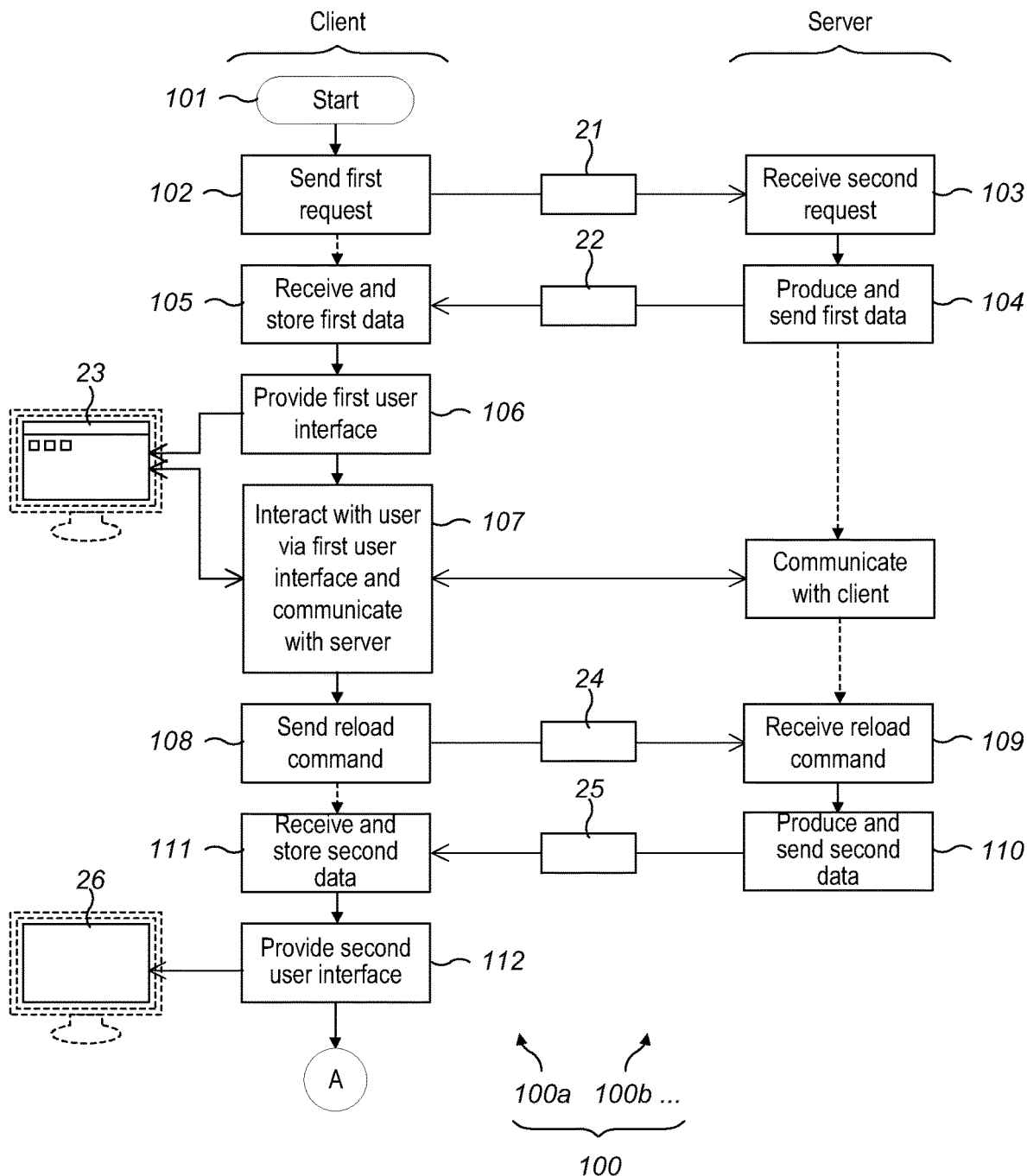
FIG. 4 illustrates parts of a method which can be performed by the system of FIG. 1.

Referring to FIG. 4, first and second parts 100a, 100b of a method 100 will now be described.

The first part 100a of the method 100 is performed by a client 2, and the second part 100b of the method 100 is performed by the server 3.

At a first step 101, the method 100 starts at the client 2.

At a second step 102, the client 2 sends a message 21 (hereinafter referred to as a request) to the server. The request 21 preferably corresponds to a Hypertext Transfer Protocol (HTTP) request. The request 21 preferably includes a Uniform Resource Locator (URL) associated with the server 3. The web browser preferably causes the client 2 to send the request 21, preferably in response to a user input.

At a third step 103, the server 3 receives the request 21.

At a fourth step 104, the server 3 produces data 22 (hereinafter referred to as first data) and sends the first data 22 to the client 2. The first data 22 preferably include a web document (e.g. a Hypertext Markup Language (HTML) document), one or more style sheets (e.g. Cascading Style Sheets (CSS)), scripts (e.g. JavaScript code) and assets (e.g. image data).

At a fifth step 105, the client 2 receives and stores/processes the first data 22.

At a sixth step 106, the client 2 provides a user interface 23 (hereinafter referred to as a first user interface) using the first data 22. The web browser preferably causes the client 2 to provide the first user interface 23.

At a seventh step 107, the client 2 interacts with the user via the first user interface 23 and communicates with the server 3. The client 2 preferably provides a mechanism for the user to identify and authenticate themselves to the server 3. The client 2 preferably provides a menu to enable the user to select from several options. The options preferably include options to create a new design or to modify an existing design. The new design may be one of several different types of design. The existing design may be one of several existing designs that are associated with the user. Data for enabling the client 2 to provide the menu is sent by the server 3 to the client 2. Data indicative of an option selected by the user is sent by the client 2 to the server 3. Such data may comprise, for example, an identifier of a type of a new design or an identifier of an existing design. If the user selects an option to create a new design, then the server 3 may initialize certain data relating to the new design. For example, the server 3 may generate a new design ID (design IDs are described below).

At an eighth step 108, the client 2 sends a message 24 (hereinafter referred to as a reload command) to the server 3. The client 2 preferably sends the reload command 24 to the server 3 after the user has selected an option to create a new design or to modify an existing design as part of the seventh step 107.

At a ninth step 109, the server 3 receives the reload command 24.

At a tenth step 110, the server 3 produces data 25 (hereinafter referred to as second data) and sends the second data 25 to the client 2.

Figure 5:
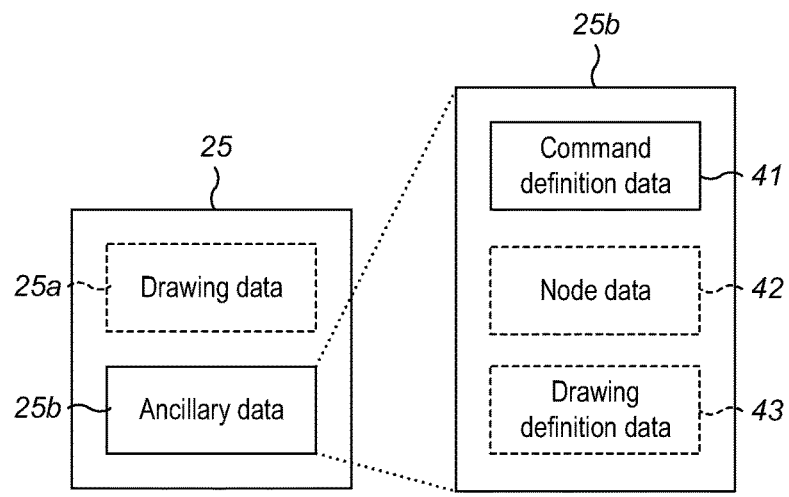
FIG. 5 illustrates ('second') data sent in the method of FIG. 4.

Referring to FIG. 5, the second data 25 will now be described. The second data 25 can include data 25a that is hereinafter referred to as drawing data. The second data 25 includes drawing data 25a only if the user selects an option to modify an existing design as part of the seventh step 107. Regardless, the second data 25 includes data 25b that is hereinafter referred to as ancillary data.

As will be explained in more detail below, the server 3 produces the drawing data 25a using data 31 (hereinafter referred to as design data) obtained from the design database 3c.

Figure 6:
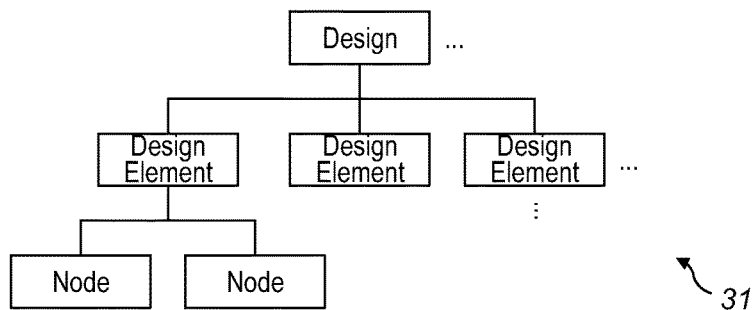
FIG. 6 illustrates ('design') data used in the method of FIG. 4.

Referring to FIG. 6, the design data 31 will now be described.

The design data 31 generally includes data relating to several existing designs.

Each design has an identifier (hereinafter referred to as a design ID). Each design may have one or more attributes, including, for example, a type of the design, identities of users that can access the design, etc.

Each design generally has a plurality of elements (hereinafter referred to as design elements).

Each design element has an identifier (hereinafter referred to an as an element ID, 'EID' in some of the figures). Design elements can be of different types. Types of design element may include, amongst other things, lines, circles, rectangles and polygons. Types of design element may also include complex objects such as electrical and electronic components. There may be different sets of types of design elements which can be used for different types of designs.

Each design element has one or more attributes. Each design element preferably has an attribute corresponding to the type of the design element (hereinafter referred to as an element type). A design element may have one or more attributes corresponding to the appearance of the design element, e.g. line colour, fill colour, etc. A design element may have one or more attributes corresponding to other aspects of the design element, e.g. electrical properties, part numbers, etc.

Each design element has one or more nodes.

Each node has an identifier (hereinafter referred to an as a node ID, 'NID' in some of the figures). Nodes preferably determine spatial attributes of the associated design element, e.g. position, size and/or shape. Each node has a position (hereinafter referred to as a node position). The node position is preferably defined using a suitable coordinate system for the design. Nodes can be of different types (hereinafter referred to as node types). In particular, nodes can be of a first type (hereinafter referred to as a centre node) or a second type (hereinafter referred to as a control node). Each design element preferably has a centre node. A centre node specifies a position of the design element. A centre node may specify a position of a centre of a design element or another defined point. A control node fully or partly specifies a size and/or a shape of a design element. A design element may have no control nodes or one or more control nodes, depending upon the type of the design element. A design element may have a predetermined size and shape and hence no control nodes. A design element, e.g. a circle, may have a single control node, e.g. specifying a position on the diameter of the circle, wherein the centre of the circle is specified by the centre node. A design element, e.g. a rectangle, may have more than one control node, e.g. to specify positions of the corners and the midpoints of the edges of the rectangle.

Each node has one or more attributes. Each node preferable has an attribute corresponding to the node type (e.g. centre or control). Each node preferable has an attribute corresponding to the node position. A node may have one or more other types of attributes, e.g. a bend radius.

Figure 7:
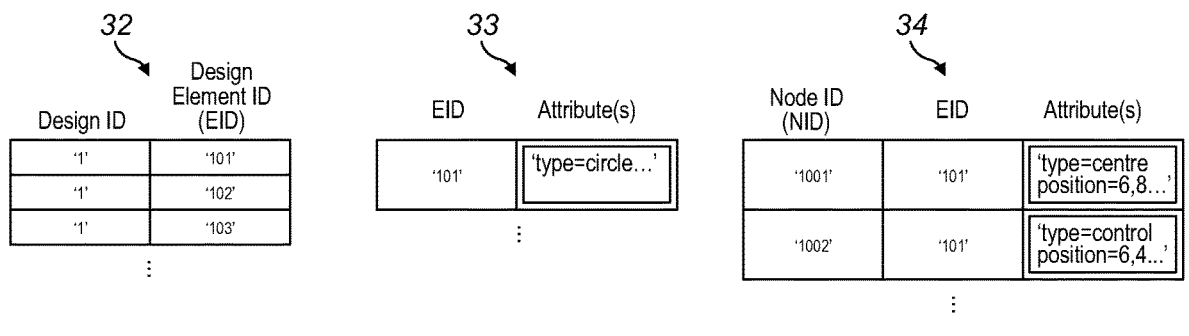
FIG. 7 illustrates a database used in the method of FIG. 4.

Referring to FIG. 7, the design database 3c will now be described. The design database 3c is preferably a Structured Query Language (SQL) database. The design database 3c preferably includes several tables, preferably at least three tables 32, 33, 34 (hereinafter referred to as first, second and third tables, respectively). The first table 32 specifies, for each design, the design elements associated with that design. The second table 33 specifies, for each design element, one or more attributes of the design element. The attributes of the design element are preferably stored in a single database field. The attributes of the design element are preferably stored in a name-value pair data structure, preferable in JavaScript Object Notation (JSON) format. Thus, different design elements with different numbers and/or types of attributes can be stored in the same table. The third table 34 specifies, for each node, the design element with which the node is associated, and one or more attributes of the node. Again, the attributes of the node are preferably stored in a name-value pair data structure, preferable in JSON format.

The second data 25 preferably has a particular data format.

Referring to FIG. 8, the particular data format for the second data 25 will now be described. The second data 25 preferably comprises a plurality of data elements $35_1 \ldots 35_N$. Each data element 35 comprises first, second and third parts 35a, 35b, 35c. Each of the parts 35a, 35b, 35c has a name-value pair data structure, preferable in JSON format. The first part 35a includes an identifier 36 (hereinafter referred to as a unique identifier, 'UID' in some of the figures) of the data element 35. The second part 35a includes a data type 37 ('dType') of data in the data element. The third part 35c includes the data 38. The unique identifier 36 is preferably a string. The data type 37 is preferably a string. The data 38 may be a string or may include one or more name-value pairs.

Referring to FIG. 9A, the drawing data 25a will now be described in more detail.

As will be explained in more detail below, the drawing data 25a is for enabling the client 2 to provide a representation of a design (hereinafter referred to as a drawing). The server 3 produces the drawing data 25a using design data 31 obtained from the design database 3c via a process which is hereinafter referred to as pre-rendering. Pre-rendering preferably includes producing an element 35' (hereinafter referred to as a drawing data element) for each design element associated with a design. A drawing data element 35' is for enabling the client 2 to provide a representation of a design element (hereinafter referred to as a drawing element). Hence the drawing data 25a generally includes a plurality of drawing data elements 35'. Pre-rendering may be performed in any suitable way. The server 3 preferably has a pre-rendering module for each type of design element.

Each drawing data element 35' preferably corresponds to a data element 35 as described above with reference to FIG. 8. The unique identifier 36' of a drawing data element 35' corresponds to the element ID of the corresponding design element. The data type 37' of a drawing data element 35' has a suitable value, e.g. 'drawing'.

The data 38' in a drawing data element 35' is generally pre-rendered graphics data. The graphics data preferably includes vector graphics data. The vector graphics data may specify an appearance of the drawing element, a position of the drawing element, and a visibility of all or part of the drawing element in the drawing (e.g. by way of a drawing order). In some examples, the drawing order is implicit from the drawing data 25a as a whole. The vector graphics data preferably has a Scalable Vector Graphics (SVG) format. The graphics data 38' may include raster graphics data.

Instead of (or in addition to) the pre-rendered graphics data, the data 38' in a drawing data element 35' may include an identifier (hereinafter referred to as a definition ID, 'defID' in some of the figures) of a drawing definition data element 35'''' (FIG. 9D). The structure and function of drawing definition data elements 35'''' will be described below.

Referring again to FIG. 5, the ancillary data 25b (which, as explained above, is provided to the client 2 with the drawing data 25a) will now be described. The ancillary data 25b includes data 41 that is hereinafter referred to as command definition data. Where the user selects an option to modify an existing design as part of the seventh step 107, the ancillary data 25b includes data 42 that is hereinafter referred to as node data. The ancillary data 25b may include data 43 that is hereinafter referred to as drawing definition data.

Referring to FIG. 9B, the command definition data 41 will now be described.

The command definition data 41 defines commands (referred to in this part as relevant commands) that can be used by the user to modify an existing design, produce a new design or perform various other actions. The relevant commands may be predetermined and may depend upon the type of design.

The command definition data 41 preferably includes an element 35'' (hereinafter referred to as a command definition data element) for each of the relevant commands. Each command definition data element 35'' corresponds to a data element 35 as described above with reference to FIG. 8. The unique identifier 36'' of a command definition data element 35'' corresponds to an identifier of the command (hereinafter referred to as a command name).

The data type 37'' of a command definition data element 35'' has a suitable value, e.g. 'command'.

Commands generally have one or more associated parameters (hereinafter referred to as command parameters). Command parameters may be optional or non-optional. For example, a command for creating a new design element corresponding to a polyline may have two non-optional command parameters specifying points on the polyline and any number of optional command parameters specifying further points on the polyline. The data 38″ in a command definition data element 35″ preferably specifies the number of (non-optional) command parameters and the type of each command parameter. Command parameters can be of several different types, including for example, the coordinates of a point, a (text) string, a node ID, an element ID, or a numeric value. Some command parameters may be either one type or another, for example either a coordinate of a point or a numerical value. Some commands are for creating new design elements. Such commands may have command parameters that relate to the position, size and/or shape of the new design element. For example, a command for creating a circle may have command parameters that include the coordinates of the centre of the circle and either the coordinates of a point on the circumference of the circle or a value of the radius of the circle.

The data 38″ in a command definition data element 35″ preferably also specifies other things such as a keyboard shortcut for the command and a description of the command to be provided to the user.

Referring to FIG. 9C, the node data 42 will now be described.

As will be explained in more detail below, the node data 42 is used by the client 2 to provide a representation of the nodes associated with a design and to detect user inputs relating to the nodes.

The node data 42 preferably includes an element 35‴ (hereinafter referred to as a node data element) for each node associated with the design. Each node data element 35‴ corresponds to a data element 35 as described above with reference to FIG. 8. The unique identifier 36‴ of a node data element 35‴ corresponds to the node ID of the node. The data type 37‴ of a node data element 35‴ has a suitable value, e.g. 'node'. The data 38‴ in a node data element 35‴ preferably specifies the element ID with which the node is associated, the node type and the node position.

Referring to FIG. 9D, the drawing definition data 43 will now be described.

The drawing definition data 43 may include one or more elements 35″″ (hereinafter referred to as drawing definition data elements). Each drawing definition data element 35″″ corresponds to a data element 35 as described above with reference to FIG. 8. The unique identifier 36″″ of a drawing definition data element 35″″ corresponds to the definition ID. The data type 37″″ of a drawing definition data element 35″″ has a suitable value, e.g. 'drawDef'. The data 38″″ in a drawing definition data element 35″″ is pre-rendered graphics data. Similarly to a drawing data element 35′, the graphics data preferably includes vector graphics data, but may include raster graphics data.

As will be explained in more detail below, if a drawing data element 35′ includes a definition ID rather than graphics data, the client 2 uses the graphics data in a drawing definition data element 35″″ with a matching ID. This can provide a way of reducing the amount of data sent from the server 3 to the client 2, in particular when several drawing data elements 35′ include a single definition ID.

The client 2 preferably always uses drawing definition data 43 to provide representations of nodes. Accordingly, the drawing definition data 43 preferably includes a drawing definition data element 35″″ for each node type. The unique identifier 36″″ of such a drawing definition data element 35″″ may simply be an identifier of the node type, e.g. 'controlNode'.

Referring again to FIG. 4, at an eleventh step 111, the client 2 receives and stores/processes the second data 25.

At a twelfth step 112, the client 2 provides a user interface 26 (hereinafter referred to as the second user interface) using the second data 25. The web browser preferably causes the client 2 to provide the second user interface 23.

Figure 10:
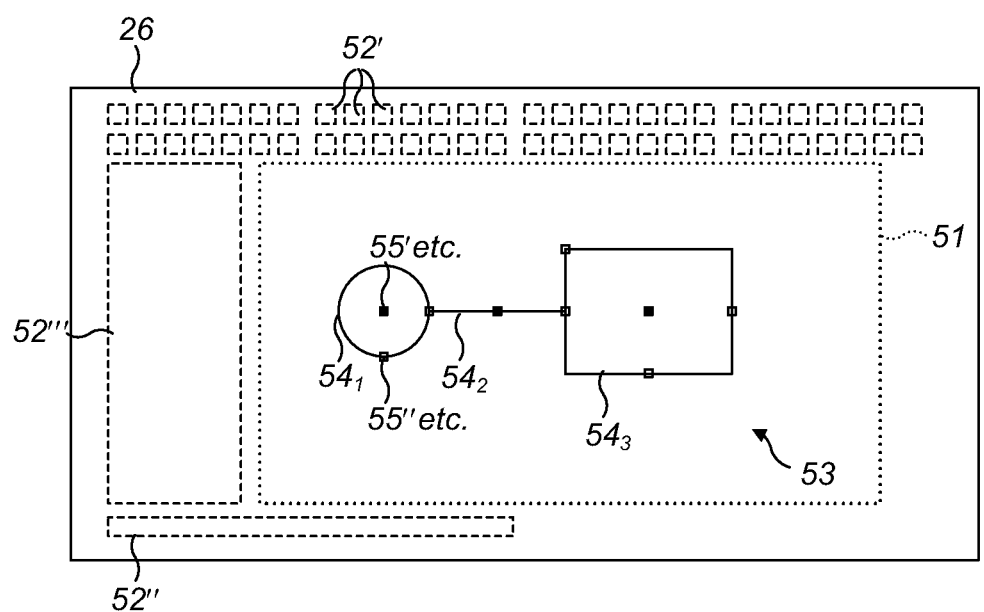
FIG. 10 illustrates a ('second') user interface provided by the method of FIG. 4.

Referring to FIG. 10, an example of the second user interface 26 will now be described. The second user interface 26 comprises an area 51 (hereinafter referred to as the drawing area) for a drawing 53. The second user interface 26 includes several elements 52 (hereinafter referred to as user interface elements) for enabling the user to take actions e.g. in relation to the design.

If the second data 25 includes drawing data 25a, then the client 2 produces a drawing 53 using the drawing data 25a. The drawing 53 (or a part of the drawing 53) is provided in the drawing area 51. The client 2 produces a drawing element 54 for each drawing data element 35′ of the drawing data 25a. Some drawing elements 54 may only be partly visible or may not be visible depending upon e.g. drawing orders and/or upon the part of the drawing 53 which is being displayed. The client 2 also produces a representation 55 (hereinafter referred to as a node element) of each node associated with the drawing data 25a. The client 2 may produce the drawing 53 and the node elements 55 in any suitable way.

In the example illustrated in the figure, the drawing 53 includes first, second and third drawing elements $54_1$, $54_2$, $54_3$ corresponding to a circle, a line and a rectangle, respectively. The drawing 53 also includes, for each of the drawing elements 54, a node element 55′ corresponding to a centre node and one or more node elements 55″ corresponding to control nodes.

The user interface elements 52 preferably include several user interface elements 52′ (hereinafter referred to as command elements) for performing commands. The client 2 provides at least some of the command elements 52′ using the command definition data 41. At least some of the command elements 52′ respectively correspond to commands specified in the command definition data 41. Some command elements 52′ may correspond to commands for creating new design elements. Some command elements 52′ may correspond to commands for editing existing design elements, etc.

The client 2 may determine aspects of the second user interface 26. For example, the client 2 may determine placement of command elements 52′ based upon categories of the corresponding commands defined in the command definition data 41.

The second user interface 26 preferably includes a user interface element 52″ that is hereinafter referred to as a command box. The second user interface 26 preferably includes a user interface element 52‴ that is hereinafter referred to as a information window. These user interface elements 52″, 52‴ will be described in more detail below.

Some of the user interface elements 52 may be accessible via one or more menus.

Figure 11:
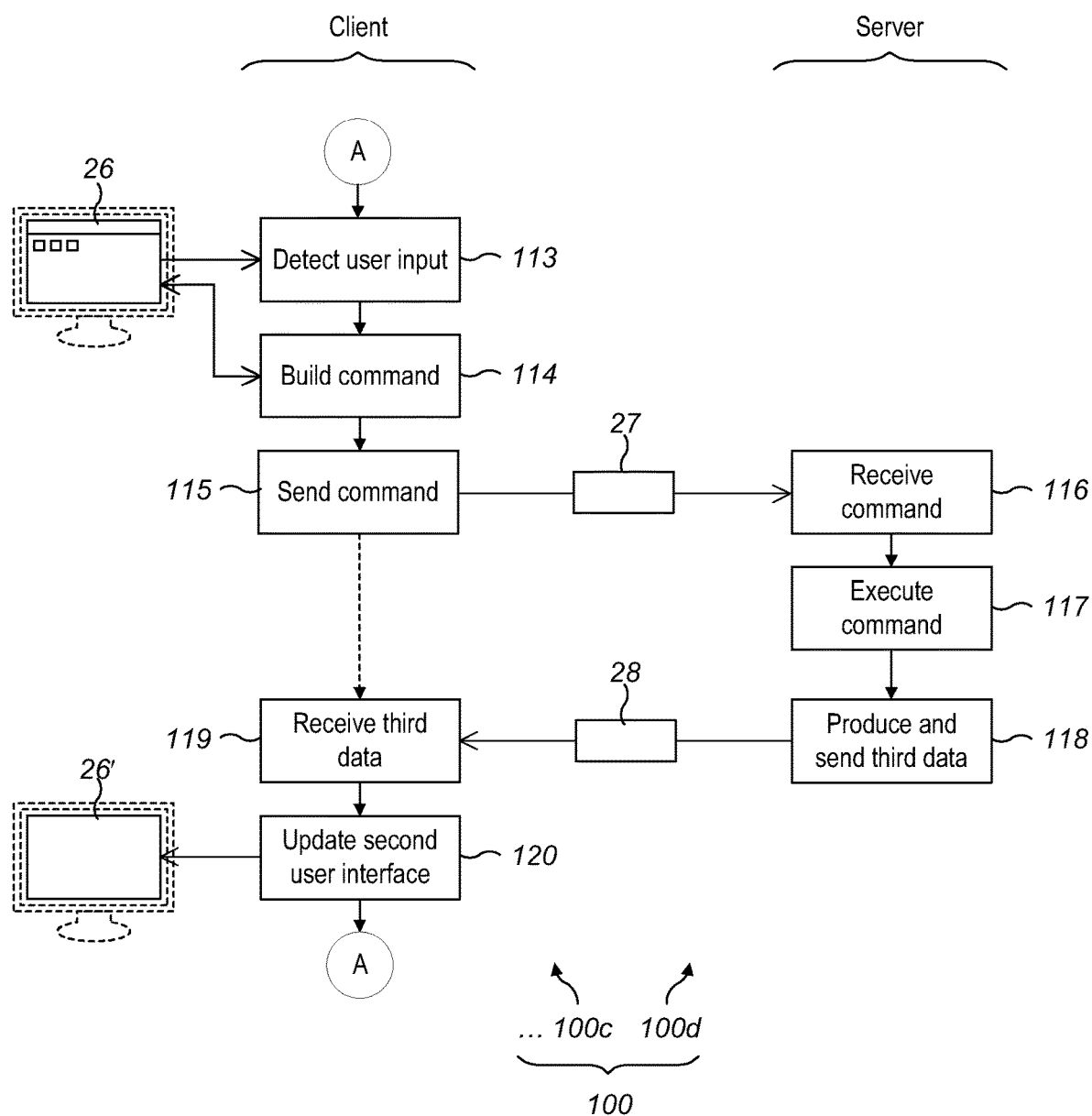
FIG. 11 illustrates other parts of the method of FIG. 4.

Referring to FIG. 11, third and fourth parts 100c, 100d of the method 100 will now be described.

The third part 100c of the method 100 is performed by the client 2, and the fourth part 100d of the method 100 is performed by the server 3.

At a thirteenth step 113, the client 2 detects a user input (hereinafter referred to as a first user input) via the second user interface 26. The first user input may relate to (e.g. 'select') a command element 52′, a drawing element 54, a node element 55, etc. The first user input may be a keyboard shortcut.

At a fourteenth step 114, the client 2 interacts with the user via the second user interface 26 to obtain data for a command, or, in other words, to build a command. A command may have no command parameters, in which case the first input may be sufficient to build the command. A command may have one or more command parameters, in which case one or more user inputs (hereinafter referred to as additional user inputs) in addition to the first user input may be needed to build the command. The command may be selected by the user either via the first user input or an additional user input. The command parameters and hence the user inputs accepted by the client 2 may be of particular types. A description of the command (from the command definition data element 35") may be provided to the user. If all of the command parameters for a particular command are non-optional, then the client 2 may determine that the command has been built once the non-optional command parameters have been obtained. If some of the command parameters for a particular command are optional (or in any case), then the client 2 may determine that the command has been built in response to a particular user input, e.g. selecting an 'OK' button.

The client 2 preferably also enables the user to build the command by entering command names and/or command parameters into the command box 52". The user can use only the command box 52" to build the command. The client 2 preferably fills the command box 52" with command names and/or command parameters in response to the above described user inputs. Thus, alternatively, the user can use a combination of the above described user inputs and the command box 52" to build the command.

In an example (hereinafter referred to as the first example), the command is for creating a new design element, e.g. a circle. In this example, the above described user inputs include a user input in relation to a command element 52' for creating a new circle, a user input to determine a position of a centre of the circle and a user input to determine a position on the circumference on the circle or a value of the radius of the circle. A user input to determine a position may involve selecting a position in the drawing area 51. The position may snap to a position of an existing node.

Figure 12:
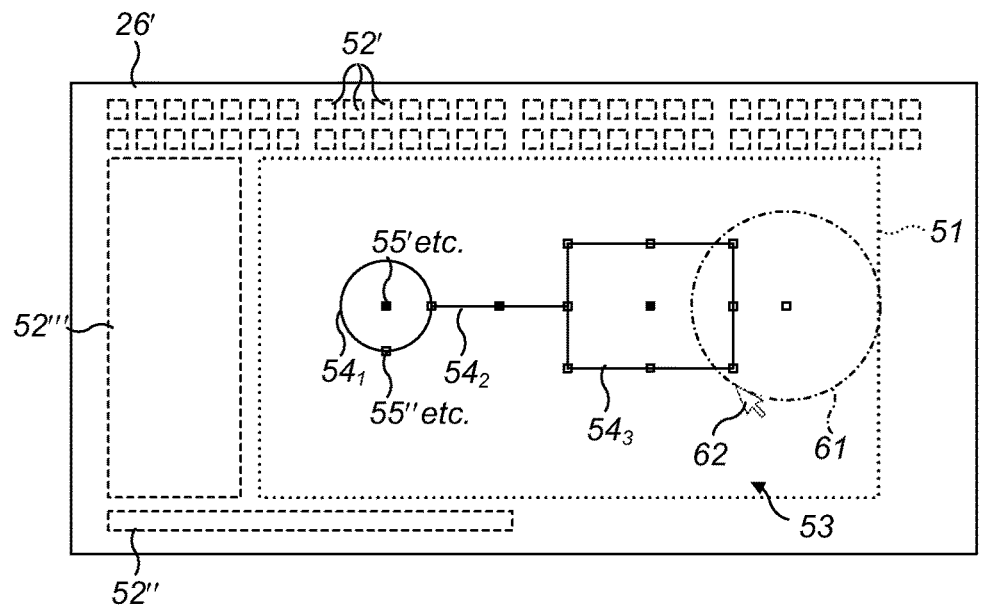
FIG. 12 illustrates an updated second user interface which may be provided by the method of FIG. 11.

Referring to FIG. 12, for certain commands, the client 2 preferably provides a representation 61 (hereinafter referred to as a command preview) of the effect of a command. The command preview 61 is preferably updated as the command parameters are changed by the user. The client 2 may provide the command preview 61 in any suitable way. The client 2 may have a module for each command. The client 2 may provide the command preview 61 in a similar way to the way in which the server 3 pre-renders the graphics data (as described above). In the example illustrated in the figure, the user has selected a command element 52' for creating a new circle, has determined the position of the centre of the circle, and is moving a mouse cursor 62 to determine the circumference of the circle.

Referring again to FIG. 11, at a fifteenth step 115, after the command has been built, the client 2 sends a message 27 (hereinafter referred to as the command message) to the server 3.

Figures 13, 14:
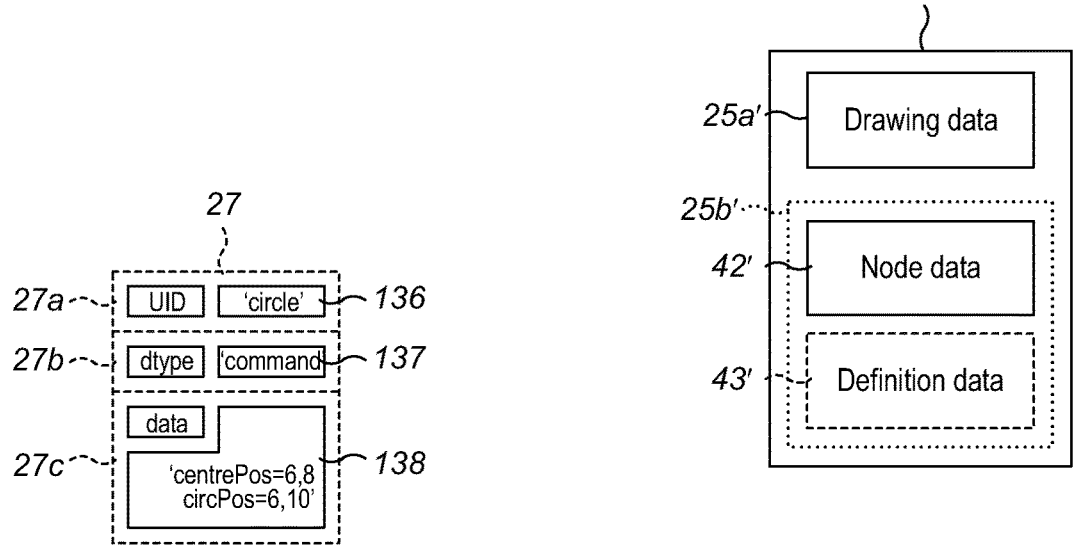
FIG. 13 illustrates a ('command') message sent in the method of FIG. 11.
FIG. 14 illustrates ('third') data sent in the method of FIG. 11.

Referring to FIG. 13, the command message 27 will now be described. The command message 27 has a data structure that corresponds to the above described data element 35 (see FIG. 8). The first part 27*a* of the command message 27 includes a unique identifier 136 corresponding to the command name. The second part 27*b* of the command message 27 includes a data type 137 having a suitable value, e.g. 'command'. The third part 27*c* of the command message 27 includes data 138 corresponding to the command parameters obtained at the thirteenth and/or fourteenth steps 113, 114. If there are no command parameters associated with the command, then the third part 27*c* of the command message 27 is preferably empty. In the first example, as illustrated in the figure, the command name is 'circle' and there are two command parameters, the first of which is the position of the centre of the circle ('centrePos'), and the second of which is a position on the circumference of the circle ('circPos').

Referring again to FIG. 11, at a sixteenth step 116, the server 3 receives the command message 27.

At a seventeenth step 117, the server 3 executes the command specified in the command message 27. This may involve updating the design database 3*c* based on the command message 27 or performing other suitable actions.

If the command was for creating a new design element, as in the first example, then the server 3 produces design data 31 corresponding to the new design element using data in the command message 27. The server 3 adds the data corresponding to the new design element to the design database 3*c*.

As explained above, a design element is preferably associated with a particular design ID. The design ID is preferably determined as part of the seventh step 107 and may be associated with a particular communications session.

As also explained above, a design element preferably has an element ID, one or more attributes including an element type, and one or more nodes, wherein each node has a node ID, a node position and a node type.

The server 3 preferably creates the element ID and each node ID by finding a lowest integer number that is not already in use as an element ID or node ID, respectively. The server 3 is preferably configured to determine the element type from the command name in the command message 27. The server 3 may be configured to determine other attributes based upon default attributes. The default attributes may be predetermined and may depend upon the element type. Other attributes may also be specified in the command message 27, and the server 3 may be configured to determine the other attributes using the command message 27.

The server 3 is preferably configured to produce a number of nodes and determine a node position and node type for each node, using data in the command message 27. This may be done in any suitable way.

In the first example, in which the design element corresponds to a circle, the server 3 produces two nodes. One node is a centre node with a node position corresponding to the position of the centre of the circle specified in the command message 27. The other node is a control node with a position on the circumference of the circle as defined by the command message 27.

The server 3 may validate the command message 27, for example by checking that the command (name) and/or command parameters are appropriate. This may be useful, for example, for commands that are entered using the command box 52" and which are not (implicitly) validated by the client 2, or commands that may require certain additional parameters in certain circumstances known by the server 3. If the server 3 determines that the command message 27 is not valid, then it may take appropriate action. For example, the server 3 may communicate with the client 2 and the client 2 may interact with the user to revise the command.

At an eighteenth step 118, the server 3 produces data (hereinafter referred to as third data 28) and sends the third data 28 to the client 2.

Referring to FIG. 14, the third data 28 will now be described.

The third data 28 preferably includes drawing data 25a' and node data 42'. The third data 28 may also include drawing definition data 43'. The drawing data 25a', node data 42' and drawing definition data 43' (if any) preferable have the data structure described above with reference to FIGS. 9A, 9C, and 9D. As will be explained in more detail below, the third data 28 is for enabling the client 2 to update the drawing 53 to reflect changes made to the design in response to the command message 27.

The third data 28 preferably includes the minimum number of drawing data elements 35' and node data elements 35''' required to update the drawing 53. The server 3 determines the drawing data elements 35' and node data element 35''' to include in the third data 28 in any suitable way.

If the command was for creating a new design element, as in the first example, then the third data 28 preferably includes a single drawing data element 35' corresponding to the new design element and one or more node data elements 35''' corresponding to the nodes associated with the new design element.

The server 3 preferably produces the drawing data 25a', the node data 42' and the drawing definition data 43' (if any) as described above in relation to the tenth step 110.

Referring again to FIG. 11, at a nineteenth step 119, the client 2 receives the third data 28.

At a twentieth step 120, the client 2 updates the second user interface 26 using the third data 25.

If the command was for creating a new design element, as in the first example, then the client 2 updates the second user interface 26 by adding a new drawing element 54₄ (FIG. 15) corresponding to the new design element. The new drawing element 54₄ is produced using the drawing data element 35' included in the third data 28. The client 2 also adds one or more new node elements 55 using the one or more node data elements 35''' included in the third data 28. The client 2 preferably produces the new drawing element 54₄ and the new node elements 55 as described above in relation to the twelfth step 112.

Figure 15:
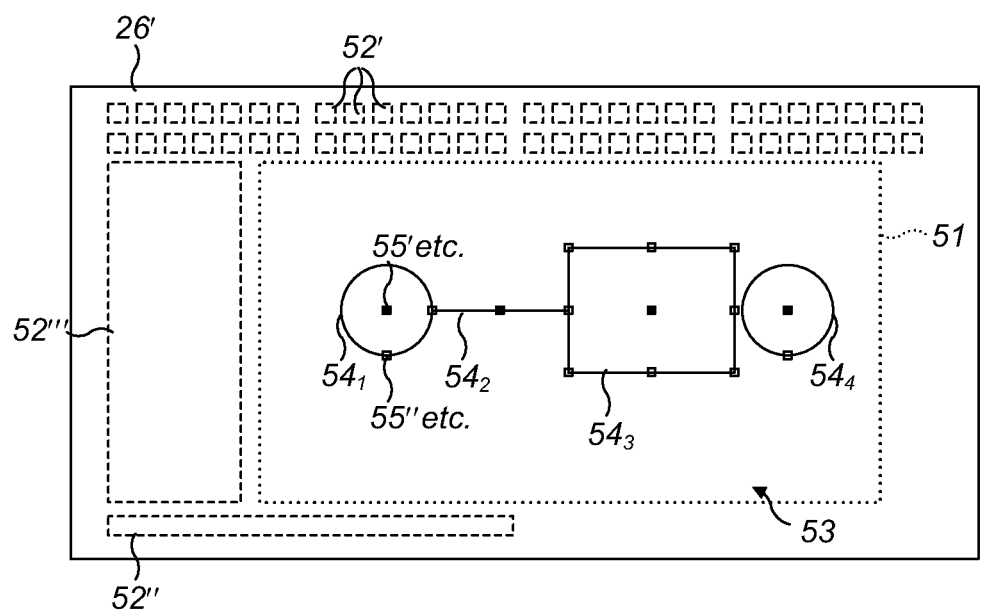
FIGS. 15, 16, 17, 18, 19, 20 and 21 illustrate further updated second user interfaces which may be provided by the method of FIG. 11.

An example of a resulting updated second user interface 26' is illustrated in FIG. 15.

Referring again to FIG. 11, thereafter, the method 100 returns to the thirteenth step 113.

Another example (hereinafter referred to as the second example) will now be described.

In the second example, the thirteenth and fourteenth steps 113, 114 involve building a command for modifying an appearance of an existing design element (referred to in this part as the relevant design element). The relevant design element may be, for example, the design element corresponding to the rectangular drawing element 54₃ (see FIG. 10).

At the fifteenth step 115, the client 2 sends, to the server 3, a command message 27 including a suitable command name, e.g. 'info', and a command parameter corresponding to the element ID of the relevant design element.

The sixteenth step 116 is as described above.

At the seventeenth step, the server 3 obtains some or all of the attributes (referred to in this part as the relevant attributes) of the relevant design element from the design database 3c. The relevant attributes may be all of the user-editable attributes of the relevant design element. The relevant attributes may be predetermined and may depend upon the element type. The server 3 communicates the relevant attributes to the client 2. The client 2 provides an output of the relevant attributes via the information window 52''. The client 2 obtains one or more user inputs to change one or more of the relevant attributes. Preferably in response to a particular user input, e.g. selecting an 'OK' button, the client 2 communicates the (changed) relevant attributes to the server 3. The server 3 updates the design database 3c by storing the relevant and/or changed attributes.

The seventeenth step 117 is as described above.

At the eighteenth step 118, the server 3 preferably produces, and sends to the client 2, third data 28 including a (single) drawing data element 35' corresponding to the relevant design element.

The nineteenth step 119 is as described above.

Figure 16:
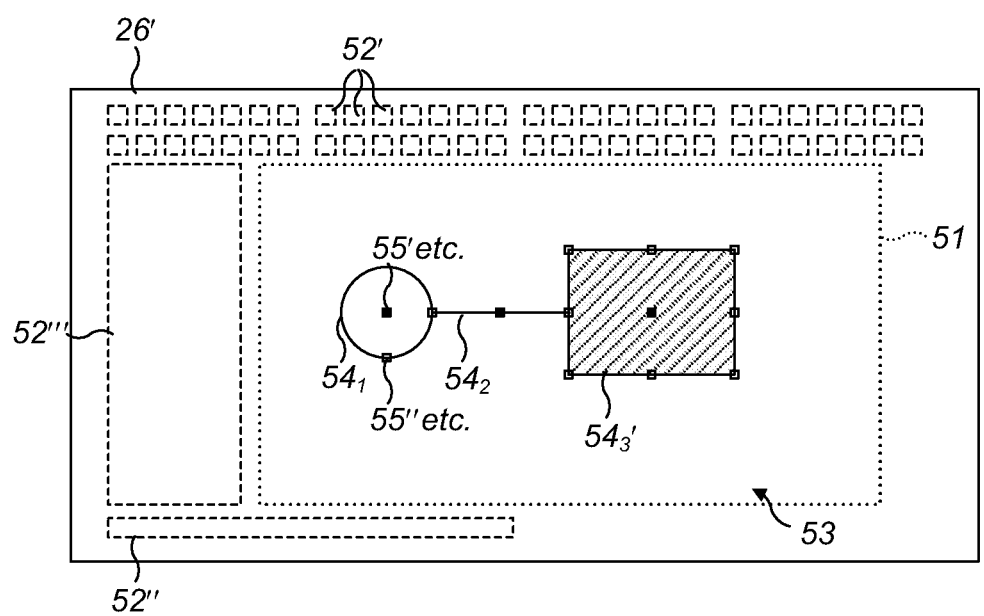

At the twentieth step 120, the client 2 updates the drawing 53 by replacing the drawing element 54₃ (see FIG. 10) corresponding to the relevant design element with a modified drawing element 54₃' (FIG. 16). The client 2 preferably uses the drawing data 25a' received at the nineteenth step 119 to update the stored drawing data 25a that is used to produce the drawing 53. The stored drawing data 25a corresponds to drawing data 25a received and stored at the eleventh step 111 and/or at a previous occurrence of the nineteenth step 119. Updating the stored drawing data 25a preferably involves storing the drawing data element 35' received at the nineteenth step 119 in place of a stored drawing data element 35' with a matching element ID.

An example of a resulting updated second user interface 26' is illustrated in FIG. 16, wherein the fill of the rectangular drawing element 54₃ has been changed.

Referring again to FIG. 11, another example (hereinafter referred to as the third example) will now be described.

In the third example, the thirteenth and fourteenth steps 113, 114 involve building a command for modifying a position, size and/or shape of an existing design element (referred to in this part as the relevant design element). The relevant design element may be, for example, the design element corresponding to the rectangular drawing element 54₃ (see FIG. 10). Such a command involves moving a node (referred to in this part as the relevant node) associated with the relevant design element.

The client 2 preferably provides a command preview as described above.

At the fifteenth step 115, the client 2 sends, to the server 3, a command message 27 including a suitable command name, e.g. 'move', a command parameter corresponding to the node ID of the relevant node, and a command parameter corresponding to the new node position of the relevant node.

At the seventeenth step 117, the server 3 updates the design database 3c to include the new node position of the relevant node. The server 3 also determines, and updates the design database 3c to include, any new node positions of any other nodes associated with the relevant design element. For example, if the relevant node corresponds to a centre node (in other words, the command corresponds to a command to move the relevant design element), then the server 3 moves the node positions of all of the nodes associated with the relevant node in the same way. If, as in the third example, the relevant node corresponds to a control node on a corner of a rectangle, then the server 3 moves the node position of four other control nodes and the centre node associated with the relevant design element in suitable ways.

At the eighteenth step 118, the server 3 preferably produces, and sends to the client 2, third data 28 including a (single) drawing data element 35' corresponding to the relevant design element and one or more node data elements 35''' corresponding to some or all of the nodes associated with the relevant design element.

The nineteenth step 119 is as described above.

At the twentieth step 120, the client 2 updates the drawing 53 as described above in relation to the second example. The client 2 also updates the drawing 53 by moving some or all of the node elements 55 associated with the relevant design element. The client 2 preferably uses the node data 42' received at the nineteenth step 119 to update stored node data 42 (which is used to produce the node elements 55). The stored node data 42 corresponds to node data 42 received and stored at the eleventh step 111 and/or at a previous occurrence of the nineteenth step 119. Updating the stored node data 42 preferably involves storing each of the node data elements 35''' received at the nineteenth step 119 in place of a stored node data element 35''' that has a matching node ID.

Figure 17:
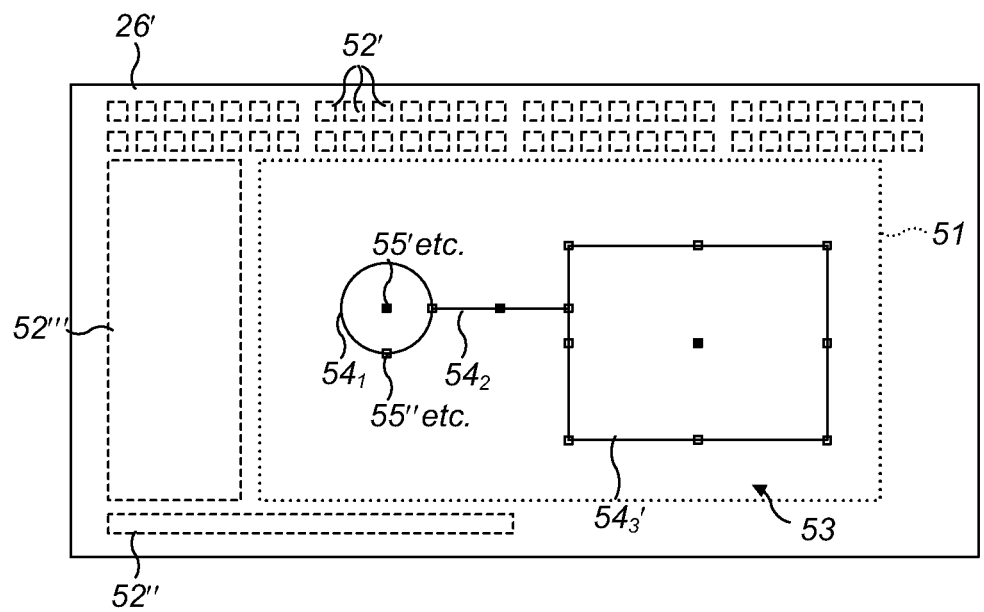

An example of a resulting updated second user interface 26' is illustrated in FIG. 17, wherein the size and (centre) position of the rectangular drawing element $54_3$' have been changed.

Referring again to FIG. 11, another example (hereinafter referred to as the fourth example) will now be described.

In the fourth example, the thirteenth and fourteenth steps 113, 114 involve building a command for cutting one or more existing design elements (referred to in this part as the relevant design elements). The relevant design elements may be, for example, the design element corresponding to the linear drawing element $54_2$ (see FIG. 10).

At the fifteenth step 115, the client 2 sends, to the server 3, a command message that includes a suitable command name, e.g. 'cut', and command parameters corresponding to the element IDs of the relevant design elements.

At the seventeenth step 117, the server 3 produces data (hereinafter referred to as clipboard data) using data corresponding to the relevant design elements in the design database 3c. The server 3 stores the clipboard data in a particular storage location (hereinafter referred to as the clipboard). The clipboard data may include some or all of the data in relevant rows of the (first,) second and third tables (32,) 33, 34 of the design database 3c.

The server 3 also updates the design database 3c by removing the data corresponding to the relevant design elements. This may involve making suitable changes to relevant rows of the first, second and/or third tables 32, 33, 34 of the design database 3c.

At the eighteenth step 118, the server 3 preferably produces, and sends to the client 2, third data 28 including drawing data elements 35' corresponding to the relevant design elements and including no graphics data. The third data 28 also includes node data elements 35''' corresponding to the nodes associated with the relevant design elements and including data indicating that the nodes are to be deleted.

The nineteenth step 119 is as described above.

At the twentieth step 120, the client 2 performs actions substantially as described above in relation to the second example. In this example, because the drawing data elements 35' received at the nineteenth step 119 include no graphics data, these actions result in the drawing elements $54_2$ (see FIG. 10) corresponding to the relevant design elements being removed from the drawing 53.

The client 2 also removes from the drawing 53 the node elements 55 associated with the relevant design element. The client 2 preferably uses the node data 42' received at the nineteenth step 119 to update the stored node data 42. Updating the stored node data 42 preferably involves, for each of the node data elements 35''' received at the nineteenth step 119, deleting a stored node data element 35''' that has a matching node ID.

Figure 18:
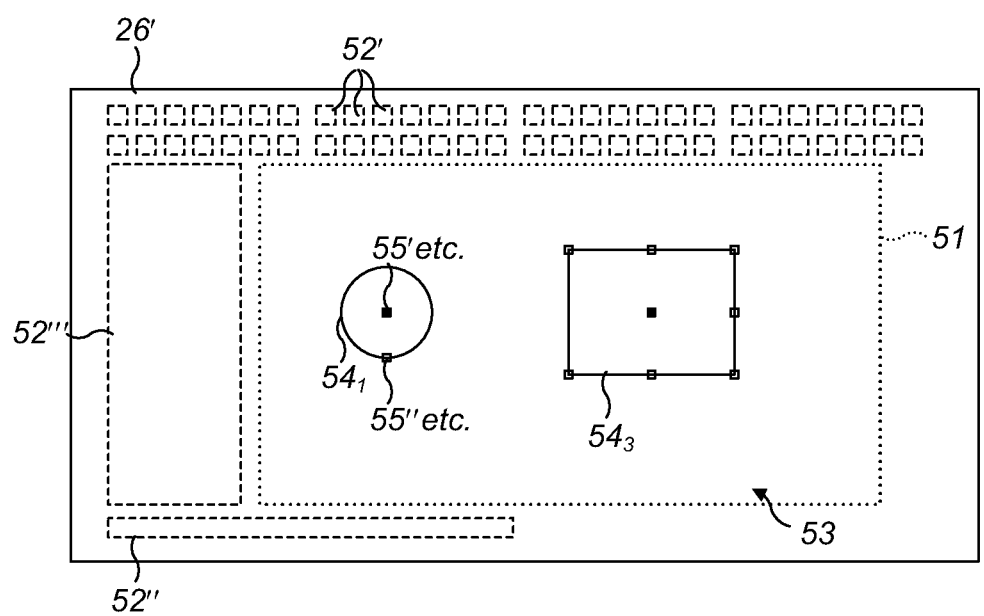

An example of a resulting updated second user interface 26' is illustrated in FIG. 18, wherein the linear drawing element $54_2$ (see FIG. 10) has been removed.

Referring again to FIG. 11, another example (hereinafter referred to as the fifth example) will now be described.

In the fifth example, the thirteenth and fourteenth steps 113, 114 involve building a command for pasting one or more design elements (referred to in this part as the relevant design elements) stored in the clipboard at the server 3.

The thirteenth to twentieth steps 113 . . . 120 are performed twice.

At a first occurrence of the thirteenth and fourteenth steps 113, 114, the client 2 detects a user input in relation to a command element 52' corresponding to a paste command.

At a first occurrence of the fifteenth step 115, the client 2 sends, to the server 3, a command message 27 including a suitable command name, e.g. 'getClipboard', and no command parameters.

The first occurrence of the sixteenth step 116 is as described above.

At the first occurrence of the seventeenth step 117, the server 3 takes no action (but see below).

At a first occurrence of the eighteenth step 118, the server 3 produces, and sends to the client, third data 28 including drawing data elements 35' corresponding to the relevant design elements. As will be explained below, these drawing data elements 35' are for enabling the client 2 to provide a representation 63 (FIG. 19) (hereinafter referred to as a paste preview) of the effect of a paste command. These drawing data elements 35' have suitable unique identifiers 36' and/or data types 37' indicative of this purpose.

The first occurrence of the nineteenth step 119 is as described above.

Figure 19:
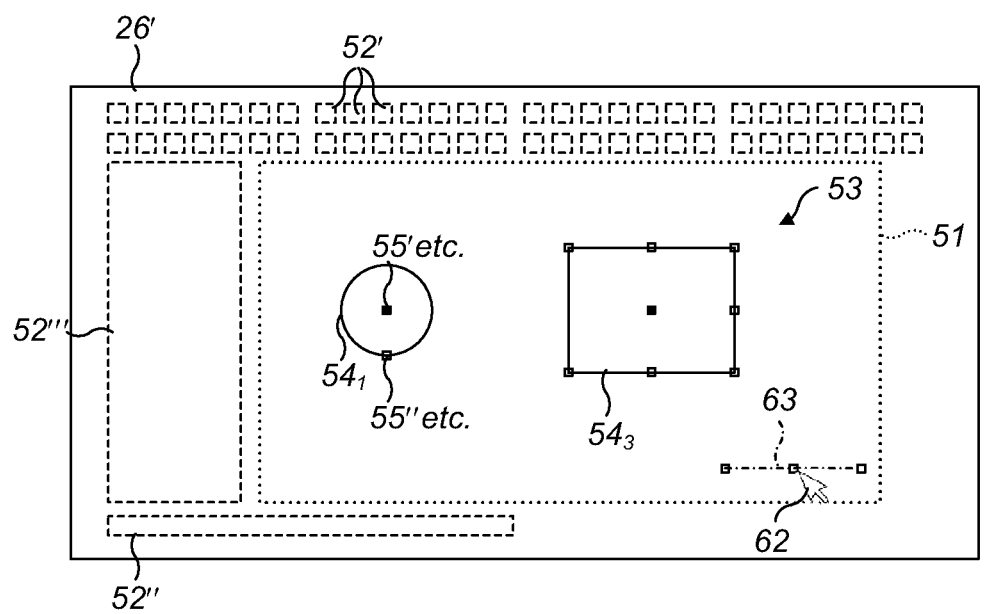

At a first occurrence of the twentieth step 120, the client 2 provides the paste preview 63 using the drawing data elements 35' received at the nineteenth step 119. The paste preview 63 is based on the graphics data in the drawing data elements 35' received at the nineteenth step 119. The client 2 preferably enables the position of the paste preview 63 to be controlled by a user input, e.g. movement of a mouse cursor 62. This is illustrated in FIG. 19.

Referring again to FIG. 11, at a second occurrence of the thirteenth and fourteenth steps 113, 114, the client 2 interacts with the user to determine a position (hereinafter referred to as the paste position) at which the relevant design elements are to be pasted. This involves detecting a user input (if any) to change a current position of the paste preview 63 and a user input, e.g. a mouse click, to indicate that the current position of the paste preview 63 is the paste position.

At a second occurrence of the fifteenth step 115, the client 2 sends, to the server 3, a command message 27 including a suitable command name, e.g. 'paste', and a command parameter corresponding to the paste position.

At a second occurrence of the seventeenth step 117, the server 3 updates the design database 3c based upon the clipboard data and the command message 27. The server 3 produces, and adds to the design database 3c, new design data 31 corresponding to the relevant design elements. This may involve some of the same operations as described above in relation to the first example. The server 3 preferably determines new values for the design ID, element ID and node IDs, rather than using any such values in the clipboard data. This is preferably done as described above in relation to the first example. The server 3 preferably uses the attributes of the nodes and elements in the clipboard data for the new design data 31 with the exception of the node positions. The node positions in the clipboard data are changed based upon the paste position. This may be performed in any suitable way, e.g. such that the centre of the relevant design elements is at the paste position.

The subsequent steps 118, 119, 120 of the method 100 are as described above in relation to the first example.

Figure 20:
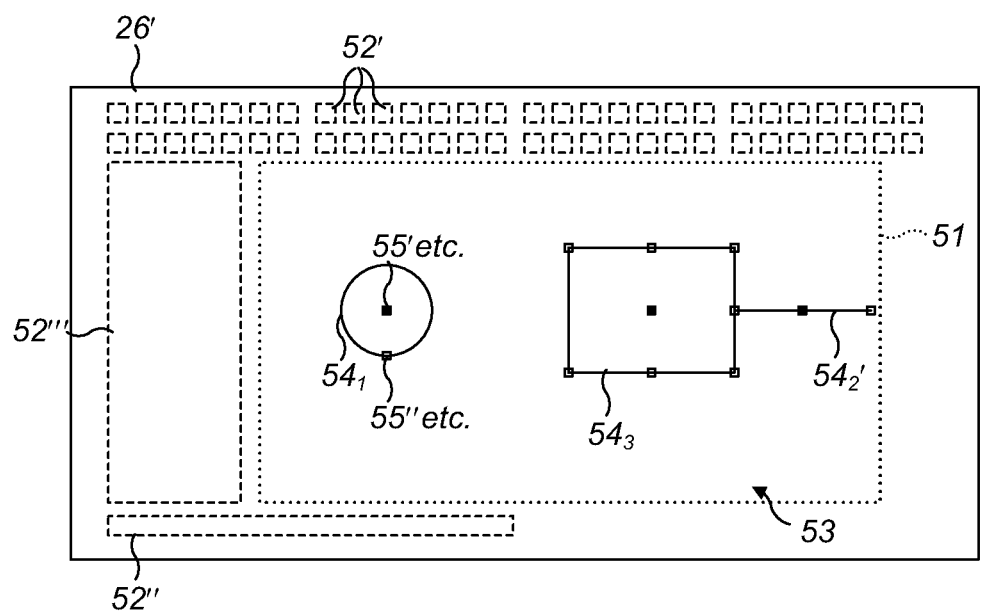

An example of a resulting updated second user interface 26' is illustrated in FIG. 20, wherein a linear drawing element $54_2'$ has been added.

Referring again to FIG. 11, another example (hereinafter referred to as the sixth example) will now be described.

In the sixth example, the thirteenth and fourteenth steps 113, 114 involve building a command for displaying labels for each of the design elements.

At the fifteenth step 115, the client 2 sends, to the server 3, a command message 27 including a suitable command name, e.g. 'showLabels' and either no command parameters or a command parameter to indicate label visibility.

At the seventeenth step 117, the server 3 may update a state associated with label visibility.

At the eighteenth step 118, the server 3 produces, and sends to the client 2, third data 28 including drawing data elements 35' corresponding to labels for each of the design elements. The graphics data for the labels may be produced in any suitable way.

The subsequent steps 118, 119, 120 of the method 100 are as described above in relation to the first example.

Figure 21:
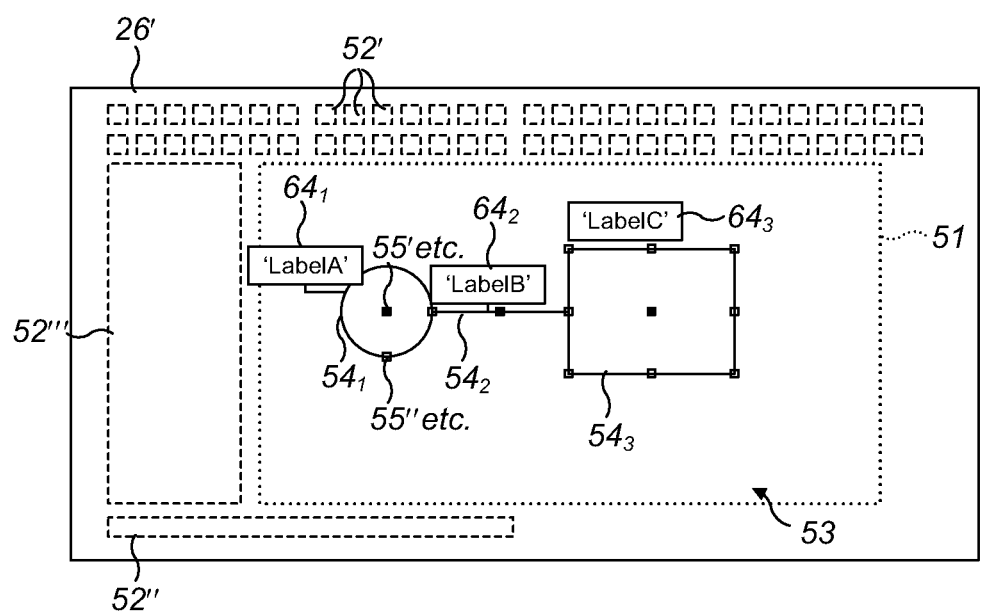

An example of a resulting updated second user interface 26' is illustrated in FIG. 21, wherein the first, second and third drawing elements $54_1$, $54_2$, $54_3$ have first, second and third labels $64_1$, $64_2$, $64_3$, respectively.

Thus, the system 1 enables the user to effectively produce a design, while the system 1 operates and handles data (e.g. the design data 31, command definition data 41 and drawing data 25a) in a way that provides various advantages. These advantages include reduced demands on a client, increased data security, increased flexibility of use, more efficient and effective administration, and so forth.

Commands may perform various other actions.

For instance, the command may be for printing a drawing 53. In such a case, the client 2 sends a suitable command message 27 to the server 3, which produces a printable document, e.g. a portable document format (PDF) file, from the design database 3c, and sends this document to the client 2. Thus, any inaccuracies associated with the drawing and/or printing functions of the web browser can be avoided.

The command may be for running a simulation of the design. For example, where the design is a design of a vehicle electrical system or wiring harness, the electrical properties of the design may be simulated. In such a case, the client 2 sends a suitable command message 27 to the server 3, which runs the simulation using data from the design database 3c, and sends results of the simulation to the client 2. Thus, simulations (and other operations that may require significant computing resources) can be performed by the most suitable part of the system 1, namely the server 3.

The command may be for performing user-define actions. Such actions can preferably be defined by the user (e.g. via an API) and stored at the server 3. Thus, the functionality of the system 1 can be tailored.

Rather than originating from the client 2, commands can also preferably originate from the server 3. In other words, the server 3 can preferably send command messages (hereinafter referred to as server command messages) to the client 2. A server command message may have substantially the same data structure as the above described command message 27 (see FIG. 13). The server 3 can send server command messages to cause the client 2 to perform various actions. For example, the server 3 can send server command messages to cause the client 2 to activate or inactivate the command element 52' corresponding to the paste command, depending upon whether or not the server 3 has clipboard data. Thus, the functionality of the user interfaces provided by the client 2 can be increased.

It will be appreciated that many other modifications may be made.

For example, instead of a web browser, a client 2 may use another type of user agent, for example a software application (e.g. an app), to cooperate with the server 3. Instead of HTTP, the client 2 and the server 3 may communicate using another type of protocol.

Instead of a database, the design data 31 may be stored in another type of data structure at, or associated with, the server 3.

Instead of a drawing, the design may be represented in another way.

The invention claimed is:

1. A method of operating a server, comprising:
   sending, to a client, data specifying a plurality of commands for use in producing a design drawing;
   receiving, from the client, one of the plurality of commands, wherein the received command is for creating or modifying a new or existing element of the design drawing, respectively;
   updating a data structure located on the server and associated with the design drawing in accordance with the command, wherein the updating comprises adding or modifying data associated with the new or existing element, respectively;
   pre-rendering a plurality of design drawing elements on the server based on the updated data structure;
   sending, to the client, data for enabling the new or modified element to be represented via a user interface, the data comprising the plurality of design drawing elements required to update the drawing; and
   sending, in response to a request from the client, data for enabling one or more elements of the design drawing to be represented via the user interface, wherein:
   the data for enabling an element to be represented via the user interface comprises raster or vector graphics data; and
   the method comprises rendering the raster or vector graphics data, wherein the rendering comprises using data associated with the element obtained from the data structure.

2. A method according to claim 1, wherein the data specifying the plurality of commands specifies, for each command, any parameters associated with the command.

3. A method according to claim 1, comprising sending data for enabling one or more nodes to be represented via the user interface, wherein each of the one or more nodes is for enabling a user to modify one of the elements of the design drawing.

4. A method according to claim 1, wherein the data structure comprises data specifying, for each of one or more elements of the design drawing, one or more nodes associated with the element, and wherein the data structure comprises data specifying one or more attributes of each element and one or more attributes of each node.

5. A method according to claim 1, wherein the data specifying a plurality of commands for use in producing a design drawing is sent directly from the client to the server, wherein the one of the plurality of commands for creating or modifying a new or existing element of the design drawing is received directly from the client, and wherein the data for enabling the new or modified element to be represented via the user interface is sent directly to the client.

6. A method according to claim 1, wherein:
the received command is a command to copy or cut an element; and
the method comprises storing data associated with the element obtained from the data structure; or
the received command is a command to paste an element; and
the method comprises adding, to the data structure, previously stored data associated with the element.

7. A method according to claim 1, comprising:
in response to a request from the client:
producing a document comprising one or more elements of the design drawing, wherein the document is for printing by the client; and
providing the document to the client.

8. The method according to claim 1, wherein the data sent to the client for enabling the new or modified element to be represented via the user interface enables one or more nodes to be represented via the user interface, wherein each of the one or more nodes enables a user to modify the one of the elements of the design drawing.

9. The method according to claim 8, wherein each element of the design drawing has one or more nodes.

10. The method according to claim 9, wherein one of the nodes associated with each element of the design drawing is a center node.

11. The method according to claim 9, wherein the one or more nodes include at least one control node.

12. The method according to claim 11, wherein the at least one control node at least partially specifies a size, a shape, or both a size and shape of a corresponding element of the design drawing.

13. The method according to claim 9, wherein each node has at least one attribute.

14. The method according to claim 13, wherein the at least one attribute comprises node position.

15. A method of operating a client, comprising:
receiving, from a server, data specifying a plurality of commands for use in producing a design drawing;
providing a user interface in accordance with the received data;
receiving, via the user interface, one or more inputs corresponding to one of the plurality of commands, wherein the command is for creating or modifying a new or existing element of the design drawing, respectively;
sending the command to the server for creation or modification of data by the server for enabling a representation of the new or modified element;
receiving, from the server, data for enabling a representation of the new or modified element to be represented via the user interface, the received data created or modified by the server in response to the command and comprising a plurality of pre-rendered design drawing elements;
providing, via the user interface, a representation of the new or modified element using the received data, wherein the method further comprises;
receiving data for enabling one or more nodes to be represented via the user interface, wherein each of the one or more nodes is for enabling a user to modify one of the elements of the design drawing;
providing, via the user interface, a representation of the one or more nodes; wherein
the one of more inputs comprise at least one input in relation to one of the one or more nodes, wherein:
the method comprises receiving, from the server, raster or vector graphics data; the data for enabling an element or node to be represented via the user interface comprises an identifier of the raster or vector graphics data; and
providing the representation of the element or node, respectively, comprises displaying the raster or vector graphics data.

16. A method according to claim 15, wherein:
the data specifying the plurality of commands specifies, for each command, any parameters associated with the command; and
the user interface is configured to obtain values for each of the parameters associated with the command before sending the command.

17. A method according to claim 15, wherein:
the data for enabling an element or node to be represented via the user interface specifies an identifier of the element or node, respectively;
the one or more inputs comprise at least one input in relation to the existing element and/or at least one node associated therewith; and
the command specifies the identifier of the existing element and/or the at least one node associated therewith.

18. A method according to claim 15, wherein the data specifying a plurality of commands for use in producing a design drawing is sent directly from the server to the client, wherein the command is sent directly from the client to the server, wherein the data for enabling a representation of the new or modified element to be represented via the user interface is received by the client directly from the server.

19. A method according to claim 15, comprising, in response to a command from server, performing an action.

20. A method according to claim 15, wherein the sent and received data comprises data with an attribute-value pair data structure, or a data type identifier, or both an attribute-value pair data structure and a data type identifier.

21. A non-transitory computer readable medium having instructions stored thereon for performing the method according to claim 15.

22. Apparatus comprising at least one processor and at least one memory having a computer program stored thereon, the at least one memory and the computer program configured to, with the at least one processor, cause the apparatus to perform a method according to claim 15.

23. Apparatus according to claim 22, wherein the user interface is provided by a web browser.

24. The method according to claim 15, wherein the data sent to the client for enabling the new or modified element to be represented via the user interface enables one or more nodes to be represented via the user interface, wherein each of the one or more nodes enables a user to modify one of the elements of the design drawing.

* * * * *